US012203238B2

(12) United States Patent
Izumi et al.

(10) Patent No.: US 12,203,238 B2
(45) Date of Patent: Jan. 21, 2025

(54) WORK MACHINE CONFIGURED TO SET A MASK RANGE IN A FIELD OF VISION OVER AN ANTENNA FOR WHICH PART OF THE WORK MACHINE CAN BECOME AN OBSTACLE WHEN RECEIVING POSITIONING SIGNALS FROM SATELLITES

(71) Applicant: HITACHI CONSTRUCTION MACHINERY CO., LTD., Tokyo (JP)

(72) Inventors: Shiho Izumi, Hitachinaka (JP); Hideto Ishibashi, Itako (JP); Shinichi Kotake, Tsuchiura (JP); Shinji Ishihara, Hitachinaka (JP); Yasuhiko Kanari, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 433 days.

(21) Appl. No.: 17/438,520

(22) PCT Filed: Sep. 25, 2020

(86) PCT No.: PCT/JP2020/036438
§ 371 (c)(1),
(2) Date: Sep. 13, 2021

(87) PCT Pub. No.: WO2021/060533
PCT Pub. Date: Apr. 1, 2021

(65) Prior Publication Data
US 2022/0220695 A1 Jul. 14, 2022

(30) Foreign Application Priority Data

Sep. 26, 2019 (JP) .................................. 2019-175717

(51) Int. Cl.
*E02F 9/20* (2006.01)
*E02F 3/32* (2006.01)
(Continued)

(52) U.S. Cl.
CPC ............... *E02F 3/435* (2013.01); *E02F 3/32* (2013.01); *E02F 9/2033* (2013.01); *E02F 9/26* (2013.01)

(58) Field of Classification Search
CPC .......... E02F 3/435; E02F 3/32; E02F 9/2033; E02F 9/26; E02F 9/267; E02F 9/264;
(Continued)

(56) References Cited

U.S. PATENT DOCUMENTS 5,323,163 A * 6/1994 Maki ....................... G01S 19/28
342/357.48
5,589,836 A 12/1996 Noetzel
(Continued)

FOREIGN PATENT DOCUMENTS

JP 04-062490 A 2/1992
JP 04-286976 A 10/1992
(Continued)

OTHER PUBLICATIONS

Izumi, WO2018008189 translation (Year: 2023).*
(Continued)

*Primary Examiner* — Marc Burgess
*Assistant Examiner* — Shien Ming Chou
(74) *Attorney, Agent, or Firm* — MATTINGLY & MALUR, PC

(57) ABSTRACT

A controller sets, as a satellite mask range, a range for which a work implement can become an obstacle when an antenna receives positioning signals from a plurality of positioning satellites on the basis of a position at which the antenna is installed, a movable range of the work implement, a posture of an upper swing structure, and an azimuth angle of the upper swing structure. The controller cancels the setting of the satellite mask range in a case where it has been determined, on the basis of satellite positioning condition data acquired from a receiver, that the setting of the satellite mask range leads to reduced precision of positioning computation by the receiver. In a case where the setting of the satellite mask range has been canceled, the receiver computes the (Continued)

position of the upper swing structure on the basis of the positioning signals transmitted from the plurality of positioning satellites.

7 Claims, 9 Drawing Sheets

(51) Int. Cl.
    *E02F 3/43*          (2006.01)
    *E02F 9/26*          (2006.01)

(58) Field of Classification Search
    CPC .......... E02F 9/20; E02F 3/436; E02F 9/2025;
         E02F 9/245; E02F 9/265; G01S 19/14;
         G01S 19/396; G01S 19/28; G01S 19/42
    See application file for complete search history.

(56) References Cited

U.S. PATENT DOCUMENTS

| | | | | |
|---|---|---|---|---|
| 6,285,925 | B1* | 9/2001 | Steffen | .................. F16P 3/141 |
| | | | | 299/30 |
| 2016/0273186 | A1 | 9/2016 | Kami et al. | |
| 2021/0286087 | A1* | 9/2021 | Yoshida | .................. G01S 19/28 |

FOREIGN PATENT DOCUMENTS

| | | | | |
|---|---|---|---|---|
| JP | 07-325141 | A | 12/1995 | |
| JP | 2002310652 | * | 10/2002 | ................ E02F 9/26 |
| JP | 2007-093483 | A | 4/2007 | |
| JP | 2016-079677 | A | 5/2016 | |
| JP | 2016-188792 | A | 11/2016 | |
| JP | 2016-224038 | A | 12/2016 | |
| JP | 2017-075820 | A | 4/2017 | |
| JP | 2017-110998 | A | 6/2017 | |
| WO | 2015/181990 | A1 | 12/2015 | |
| WO | WO-2017208997 | A1 * | 12/2017 | ................ E02F 9/20 |
| WO | WO-2018008189 | A1 * | 1/2018 | ................ E02F 3/43 |

OTHER PUBLICATIONS

Marais Satellite propagation path model along a railway track for GNSS applications, IEEE 2004 (Year: 2004).*
Electronichub, What is Global Positioning System? Understanding GPS, www.electronichub.org, 2017 (Year: 2017).*
Nagato, WO2017208997 translation (Year: 2023).*
International Preliminary Report on Patentability received in corresponding International Application No. PCT/JP2020/036438 dated Apr. 7, 2022.
International Search Report of PCT/JP2020/036438 dated Dec. 1, 2020.

* cited by examiner

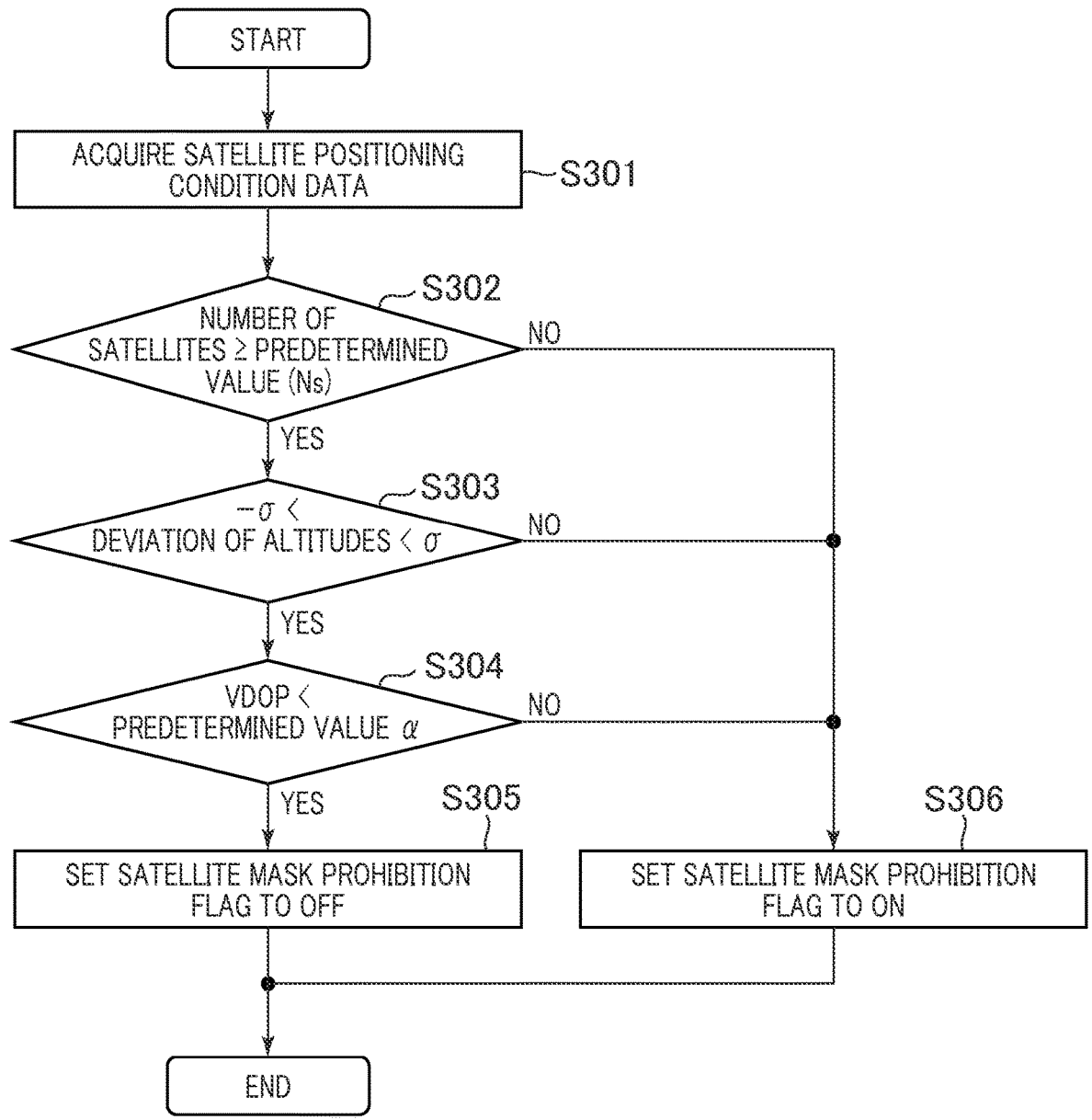

WORK MACHINE CONFIGURED TO SET A MASK RANGE IN A FIELD OF VISION OVER AN ANTENNA FOR WHICH PART OF THE WORK MACHINE CAN BECOME AN OBSTACLE WHEN RECEIVING POSITIONING SIGNALS FROM SATELLITES

TECHNICAL FIELD

The present invention relates to a work machine provided with a controller that computes a position of a machine body on the basis of satellite signals received from a plurality of satellites, and that computes a position of a control point on the work machine on the basis of a result of the computation and a posture of a work implement.

BACKGROUND ART

In recent years, computerized construction has been increasingly introduced in construction sites. The computerized construction is a system that realizes higher efficiency in construction by utilizing electronic information and ICT (Information and Communication Technology) with focus placed on the construction among a series of construction processes including survey, design, construction, inspection, management, and so on. As machines that support the computerized construction, work machines, typified by hydraulic excavators, are known in which a guidance function of displaying, on a monitor, a position of a machine body and a position and posture of a front work implement together with position information regarding a construction target surface, and a machine control function of controlling the front work implement such that a bucket will not excessively excavate the construction target surface are implemented. Such a work machine that supports the computerized construction provides a function of providing assistance in a work and an operation by presenting information to an operator on the basis of computerized construction data having three-dimensional coordinate information. In machine guidance for a hydraulic excavator, for example, a position of a bucket tip is computed from information regarding a position and posture of a machine body and information regarding a posture of a front work implement, and a position of a bucket relative to a construction target surface is presented to an operator via a monitor.

In order to compute position information regarding an upper swing structure (a machine body) in a global coordinate system (a geographic coordinate system), a hydraulic excavator of this type is sometimes equipped with a satellite positioning system (e.g., a GNSS (Global Navigation Satellite System)) that receives positioning signals from positioning satellites via a positioning antenna attached to the upper swing structure, thereby computing a position of the upper swing structure. However, a front member of the hydraulic excavator, such as a boom, an arm, or a bucket, sometimes exists above the positioning antenna of the satellite positioning system, and accordingly, sometimes interferes with reception of positioning signals over a straight route. When this happens, it is probable that the positioning antenna will receive the positioning signals as diffracted waves or reflected waves called multipath. Using the received diffracted waves or reflected waves for positioning computation leads to an increased likelihood of an error in a positioning result. Thus, Patent Document 1, for example, describes a technique that aims to reduce an effect of multipath.

In a hydraulic excavator described in Patent Document 1, an outer surface of an upper structure, such as a front work implement, that can be located above a positioning antenna is covered with an electromagnetic wave absorber to prevent a positioning signal from being reflected by the upper structure and received by the positioning antenna to prevent a reduction in precision of position measurement.

PRIOR ART DOCUMENT

Patent Document

Patent Document 1: JP-2017-75820-A

SUMMARY OF THE INVENTION

Problem to be Solved by the Invention

However, the technique described in Patent Document 1, which is able to reduce an effect of a signal (a reflected wave) that is reflected by the upper structure (the front work implement), is not able to reduce an effect of a signal (a diffracted wave) that is diffracted at the upper structure.

In general, hydraulic excavators are work machines that perform a work by repeating a series of operations, such as excavation, swing, and soil dumping, with use of a front work implement, and the posture of the front work implement can frequently be changed during the work. A change in the posture of the front work implement can lead to a change in a positioning satellite that transmits positioning signals interrupted by the front work implement, which may change a combination of positioning satellites used for positioning computation. A change in the combination of the positioning satellites used for the positioning computation can cause great variation in positioning results, and can cause a reduction in reproducibility of positioning results even while the same work is being performed at the same position. This can cause a deterioration in precision in computing the position of the front work implement (a bucket claw tip), which can lead to a problem of the shape of an actual finished surface being different from that of a construction target surface, for example.

The present invention has been conceived to solve the above-described problem, and an object thereof is to provide a work machine capable of computing the position of the work machine with high precision on the basis of positioning signals from positioning satellites.

Means for Solving the Problem

The present application includes a plurality of means for solving the above-described problem, and one example thereof is a work machine including: a lower travel structure; an upper swing structure mounted to the lower travel structure so as to be capable of swinging; a work implement mounted to the upper swing structure so as to be capable of rotating; an antenna that receives positioning signals from a plurality of positioning satellites; a receiver configured to compute a position of the upper swing structure on the basis of the positioning signals received by the antenna; a posture sensor that detects a posture of each of the upper swing structure and the work implement; and a controller configured to compute a position of a control point set in the work implement on the basis of the position of the upper swing structure computed by the receiver, an azimuth angle of the upper swing structure, the posture of the work implement detected by the posture sensor, and dimensional data on the work implement, in which the controller is configured to set, as a mask range, a range in a field of vision in a sky over the antenna for which the work implement can become an obstacle when the antenna receives the positioning signals from the plurality of positioning satellites on the basis of a position at which the antenna is installed, a movable range of the work implement, the posture of the upper swing structure detected by the posture sensor, and the azimuth angle of the upper swing structure, in a case where it has been determined that the work implement is performing a work that demands precision, in which the receiver is configured to compute the position of the upper swing structure on a basis of positioning signals from, out of the plurality of positioning satellites, positioning satellites that remain after excluding a positioning satellite or satellites located in the mask range, in a first case in which the controller has determined, on the basis of satellite positioning condition data acquired from the receiver, that setting of the mask range leads to improved precision of the computation of the position of the upper swing structure by the receiver, and in which the receiver is configured to compute the position of the upper swing structure on the basis of the positioning signals transmitted from the plurality of positioning satellites without using the mask range, in a second case in which the controller has determined, on the basis of the satellite positioning condition data acquired from the receiver, that the setting of the mask range leads to reduced precision of the computation of the position of the upper swing structure by the receiver.

Advantages of the Invention

According to the present invention, a position of a work machine can be computed with high precision on the basis of positioning signals from positioning satellites.

BRIEF DESCRIPTION OF THE DRAWINGS

FIG. 9 illustrates a processing flow of the controller (a satellite mask setting section) according to the embodiment of the present invention.

MODES FOR CARRYING OUT THE INVENTION

Figure 1:
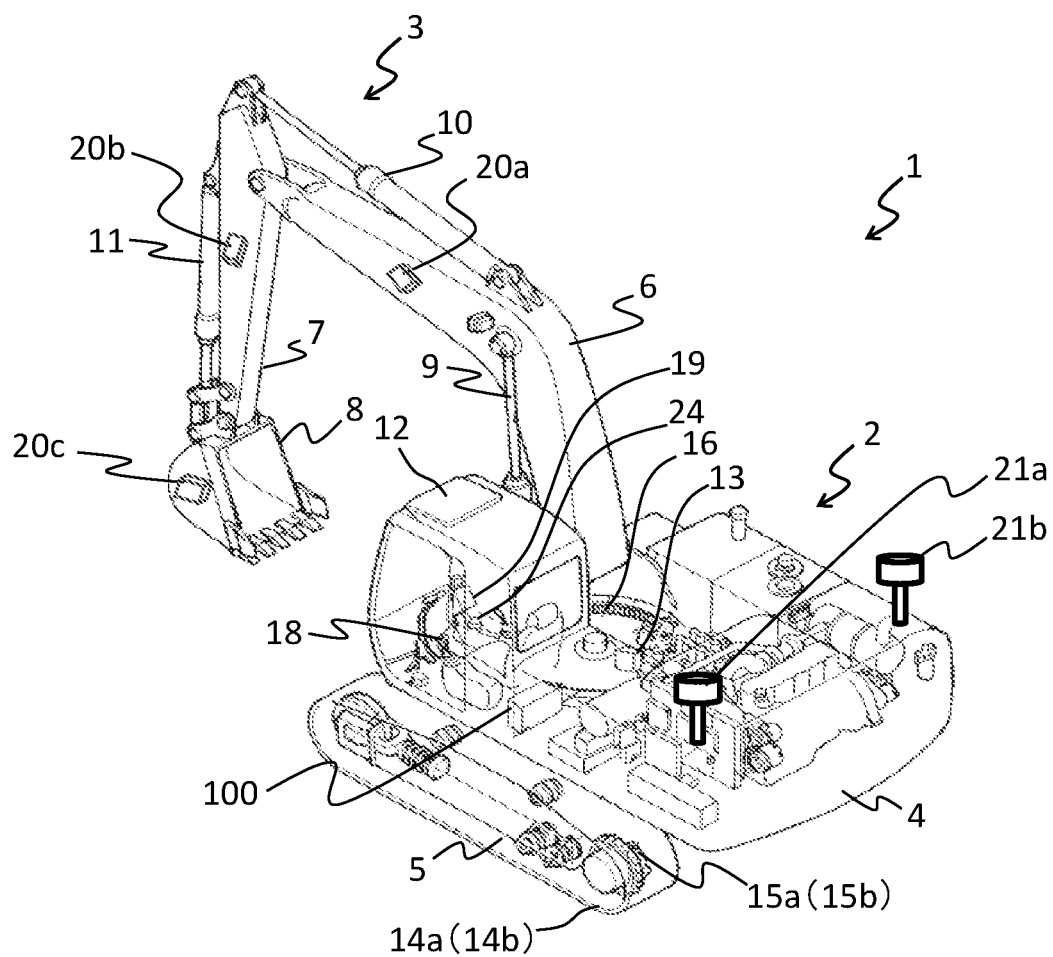
FIG. 1 is a schematic diagram of a structure of a hydraulic excavator according to an embodiment of the present invention.

Hereinafter, an embodiment of the present invention will be described with reference to the accompanying drawings. In the present embodiment, the present invention is applied to a crawler-type hydraulic excavator as a work machine, and a control point (a point on the hydraulic excavator the position of which is computed by a controller 100 for control) is set at a bucket tip of the hydraulic excavator. Note that the control point may be set at any position on the hydraulic excavator, and that a work tool of a front work implement is not limited to a bucket as described below. Also note that the present invention is applicable not only to the hydraulic excavator described below but also to any other work machine provided with a receiver that receives positioning signals from positioning satellites via an antenna and computes the position of a main body (an upper swing structure) thereof in a global coordinate system. Also note that, in the accompanying drawings, like members are designated by like reference characters, and redundant description may be omitted.

FIG. 1 is a schematic diagram of a hydraulic excavator 1. In FIG. 1, the hydraulic excavator 1 includes a main machine body 2 and a multi-joint front work implement 3. The main machine body 2 includes a crawler-type lower travel structure 5, and an upper swing structure 4 mounted on the lower travel structure 5 so as to be capable of swinging in a left-right direction. The front work implement 3 is mounted to the upper swing structure 4 so as to be capable of rotating. The front work implement 3 includes a plurality of front members including a boom 6, an arm 7, and a bucket 8, which are driven by a boom cylinder 9, an arm cylinder 10, and a bucket cylinder 11, respectively, which are hydraulic cylinders.

A plurality of posture sensors 20 (20a, 20b, and 20c) for detecting the posture of the front work implement 3 are installed on the front work implement 3. The posture sensors 20a, 20b, and 20c are installed on the front members 6, 7, and 8, respectively, and output posture data for computing the postures of the respective front members 6, 7, and 8. The posture of each of the front members 6, 7, and 8 can be computed from the outputted posture data, and the posture of the front work implement 3 can be computed by combining the postures thereof. As each of the posture sensors 20a, 20b, and 20c, an inertial measurement unit (IMU) capable of detecting an angle of inclination with respect to a predetermined plane (e.g., a horizontal plane), for example, can be used.

A posture sensor 20d (see FIG. 3) for detecting the posture (inclination angles) of the upper swing structure 4 is installed on the upper swing structure 4. The posture of the upper swing structure 4 can be computed from posture data outputted by the posture sensor 20d. As the posture sensor 20d, an inertial measurement unit (IMU), for example, can be used as is the case with each of the posture sensors 20a to 20c.

The upper swing structure 4 has installed therein a cab 12, a hydraulic swing motor (swing drive device) 13, an engine (not depicted), a hydraulic pump (not depicted) that is driven by the engine to supply a hydraulic operating fluid to hydraulic actuators in the hydraulic excavator, and other devices.

Moreover, the upper swing structure 4 has installed therein a satellite positioning system 21 (antennas 21a and 21b and a receiver 21c) for detecting the position of the upper swing structure 4 in the global coordinate system, a controller 100 capable of computing the position (e.g., the position in a site coordinate system) of the control point set in the hydraulic excavator 1 (including the front work implement 3), and a communication device 23 (see FIG. 2) for the controller 100 to communicate with an external terminal, particularly, an external server 102.

The cab 12 has provided therein a plurality of operation levers (operation devices) 18 for operating the hydraulic actuators in the hydraulic excavator. In the present embodiment, an operator is able to drive each of the boom cylinder 9, the arm cylinder 10, the bucket cylinder 11, the hydraulic swing motor 13, and hydraulic travel motors 15a and 15b by operating a corresponding one of the operation levers 18. An operation amount inputted by the operator to each of the operation levers 18 is detected by a corresponding one of operation sensors 17 (see FIG. 2), and is outputted to the controller 100. When the operation lever 18 is of a hydraulic pilot type, for example, a pressure sensor can be used as the operation sensor 17.

In addition, the cab 12 is provided with a construction target surface setting device 24 for registering three-dimensional data (3D design surface data) on a design surface for creating a construction target surface in a storage device (not depicted) in the controller 100, a monitor (display device) 19 for displaying various types of information, including a positional relation between the front work implement 3 and the construction target surface, a control mode selection switch 26 for the operator to select any one of a rough excavation mode and a finishing mode as a control mode of limiting control (machine control), which will be described below, and a storage device (e.g., a semiconductor memory) 25 (see FIG. 2), which is a device for storing various types of information inputted to and outputted from the controller 100. The controller 100 and the storage device 25 are installed inside the cab 12 in the present embodiment, but may alternatively be installed outside of the cab 12. In addition, the storage device in the controller 100 may be used as a substitute for the storage device 25.

The lower travel structure 5 has crawler belts 14a and 14b on left and right sides, and the crawler belts 14a and 14b are driven by the hydraulic travel motors 15a and 15b, respectively, to cause the lower travel structure 5 to travel. It is to be noted that, in FIG. 1, only the crawler belt 14a and the hydraulic travel motor 15a on the left side are illustrated, and the crawler belt 14b and the hydraulic travel motor 15b on the right side are not illustrated. The upper swing structure 4 is rotatably connected to the lower travel structure 5 through a swing ring 16, and is driven by the hydraulic swing motor 13.

Figure 2:
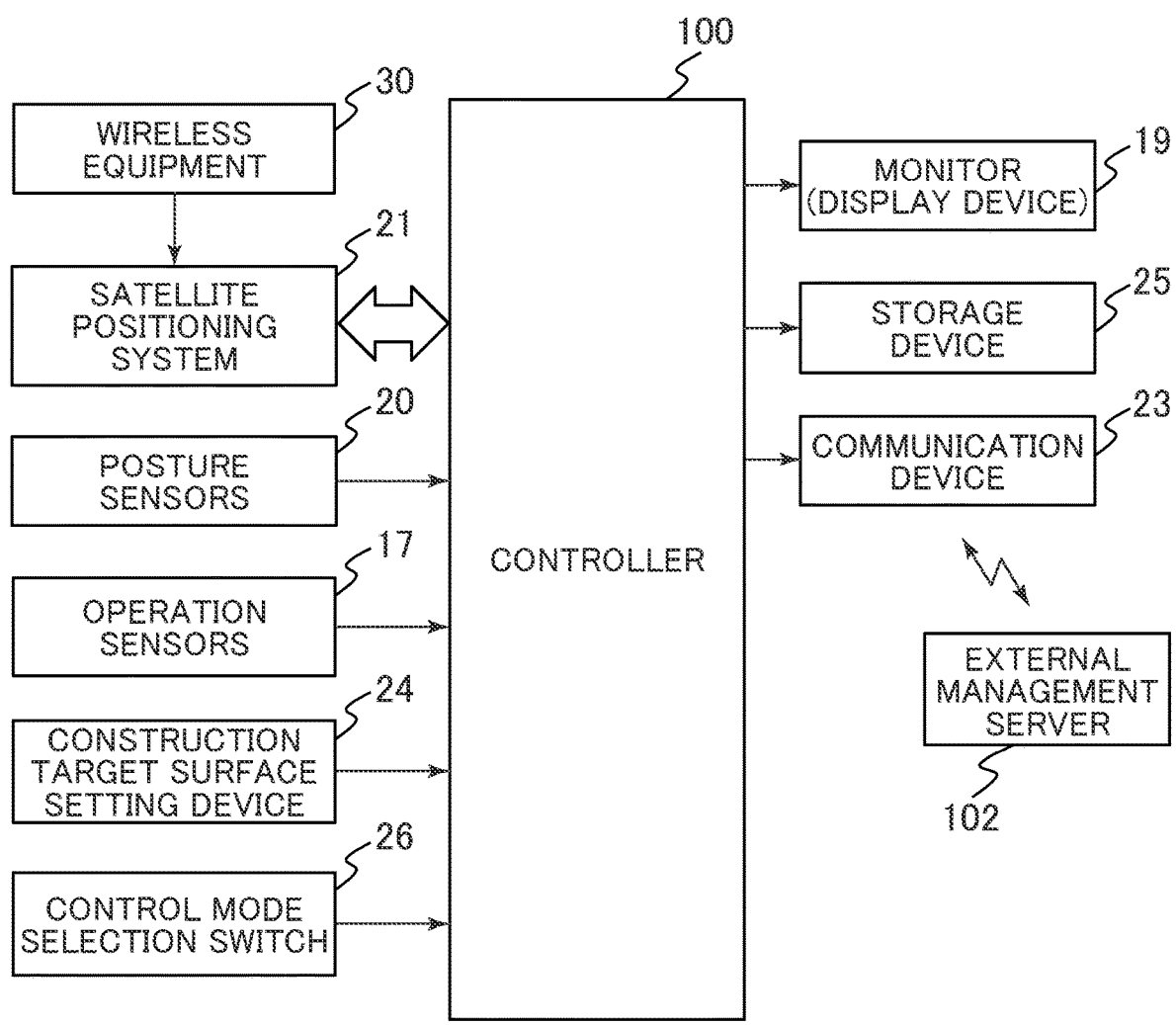
FIG. 2 is a schematic diagram of a hardware configuration of a control system according to the embodiment of the present invention.

FIG. 2 illustrates an example system configuration of a position measurement system according to an embodiment of the present invention.

In FIG. 2, the satellite positioning system 21 is connected to wireless equipment 30 installed on the upper swing structure 4. The wireless equipment 30 is used to receive correction data transmitted from a satellite positioning system installed in a reference station having known coordinates in the global coordinate system, and the received correction data is outputted to the receiver 21c in the satellite positioning system 21.

As illustrated in FIG. 1, the satellite positioning system 21 is installed on an upper surface of the upper swing structure 4, and includes two GNSS antennas 21 (a first GNSS antenna 21a and a second GNSS antenna 21b) for receiving positioning signals from a plurality of positioning satellites, and the receiver 21c capable of computing a position and an azimuth angle of the upper swing structure 4 in real time on the basis of the positioning signals received by the first GNSS antenna 21a and the second GNSS antenna 21b and the correction data received by the wireless equipment 30.

Each of the first GNSS antenna 21a and the second GNSS antenna 21b is an antenna for RTK-GNSS (Real Time Kinematic-Global Navigation Satellite Systems).

The receiver 21c computes position data (position data on the upper swing structure 4) on the GNSS antennas 21a and 21b from the positioning signals received by the first GNSS antenna 21a and the second GNSS antenna 21b, computes a vector from one of the GNSS antennas to the other GNSS antenna, using the position data on the two GNSS antennas 21a and 21b, and calculates an orientation (azimuth angle) of the upper swing structure 4 on the basis of a direction of the vector. Data on the azimuth angle and the position data as to the upper swing structure 4 computed by the receiver 21c are outputted to the controller 100.

Inclination angle data on the front members 6, 7, and 8 and the upper swing structure 4 detected by the posture sensors 20 (20a, 20b, 20c, and 20d) are outputted to the controller 100.

Data on the operation amounts on the operation levers 18 detected by the operation sensors 17 is outputted to the controller 100. The operation sensors 17 are provided for the respective objects operated by the operation levers 18, and detect pressures (pilot pressures) of the hydraulic operating fluid outputted as operation signals of the boom 6, the arm 7, the bucket 8, the upper swing structure 4, and the lower travel structure 5.

The operation levers 18 are provided with the control mode selection switch 26. The control mode selection switch 26 is a switch capable of selecting, as the control mode of the limiting control (machine control), which will be described below, one of the rough excavation mode, in which a higher priority is given to the operation velocity of the front work implement 3 (e.g., the operation velocity of the arm 7) than to precision of the construction target surface, and the finishing mode, in which a higher priority is given to the precision of the construction target surface than to the operation velocity of the front work implement 3 (e.g., the operation velocity of the arm 7).

The rough excavation mode is, for example, a mode in which no limitation is placed on the operation velocity of the arm 7 (the arm cylinder 10) during the limiting control. In this mode, no limitation is placed on the operation velocity of the arm 7, and the arm 7 operates at a velocity that matches the operation by the operator, allowing a speedy excavation work. However, because no limitation is placed on the velocity of the arm even when the bucket 8 is close to the construction target surface, the bucket 8 can break downwardly into the construction target surface depending on the velocity of the arm.

The finishing mode is, for example, a mode in which a limitation is placed on the operation velocity of the arm 7 (the arm cylinder 10) during the limiting control. In this mode, a maximum value of the operation velocity of the arm 7 is set to be smaller as the bucket 8 approaches the construction target surface, for example. In this case, the velocity of the arm when the bucket 8 is in the vicinity of the construction target surface tends to become lower than a velocity specified by the operation by the operator, but it is made easier to position the bucket 8 on or over the construction target surface, enabling a highly precise excavation work without doing damage to the construction target surface.

A switch of a push button type, for example, can be used as the control mode selection switch 26. In the present embodiment, when the operator performs construction using the limiting control, the control mode can be switched to a desired control mode by pressing the control mode selection switch 26. In particular, in a work for which the operator demands precision in construction, a switching between the finishing mode which allows highly precise construction, and the rough excavation mode which does not allow highly precise construction, can be made by pressing the switch near at hand. While the control mode selection switch 26 is provided in the operation levers 18 in the example of the present embodiment described above, the control mode selection switch 26 can be separately provided at another place in the cab 12, or can be provided as an image of a switch on the monitor 19.

The construction target surface setting device 24 is a device for registering the 3D design surface data for creating the construction target surface in the storage device (not depicted) in the controller 100. The construction target surface setting device 24 is, for example, a controller (e.g., a tablet terminal provided with a touch panel display) that serves also as a display prepared for computerized construction, and can be used to make various types of settings, including a setting of contents of a work, and also to make settings concerning machine guidance.

The 3D design surface data can be inputted to the construction target surface setting device 24 through, for example, a nonvolatile semiconductor memory or the like. In addition, the 3D design surface data can also be loaded by being inputted from a server through a network. This device may be combined with the controller 100, or the functions of the construction target surface setting device 24 may be implemented on the controller 100.

The display device 19 is a device that displays various types of information. In the present embodiment, the display device 19 is a liquid crystal display monitor installed inside the cab 12, and on the monitor 19, information, such as an image of a side view of the hydraulic excavator 1 generated on the basis of the information acquired by the posture sensors 20, and the shape of a section of the construction target surface, is presented to the operator.

The storage device 25 is a device for storing various types of information. The storage device is, for example, a nonvolatile storage medium, such as a semiconductor memory, and is detachably attachable via a dedicated insert port inside the cab 12.

The communication device 23 is a device used for transmission and reception of data between the controller 100 and an external terminal (e.g., an external management server 102). The communication device 23 performs transmission and reception of data with the server 102, which is at a location distant from the excavator 1, via satellite communication, for example. Specifically, the communication device 23 transmits data recorded on the storage device 25 or secondary data generated on the basis of such data to the server 102 through a base station. In addition, the communication device 23 may realize exchange of data between the excavator 1 and the base station via a mobile phone network, a short-range wireless communication network, or the like.

Figure 3:
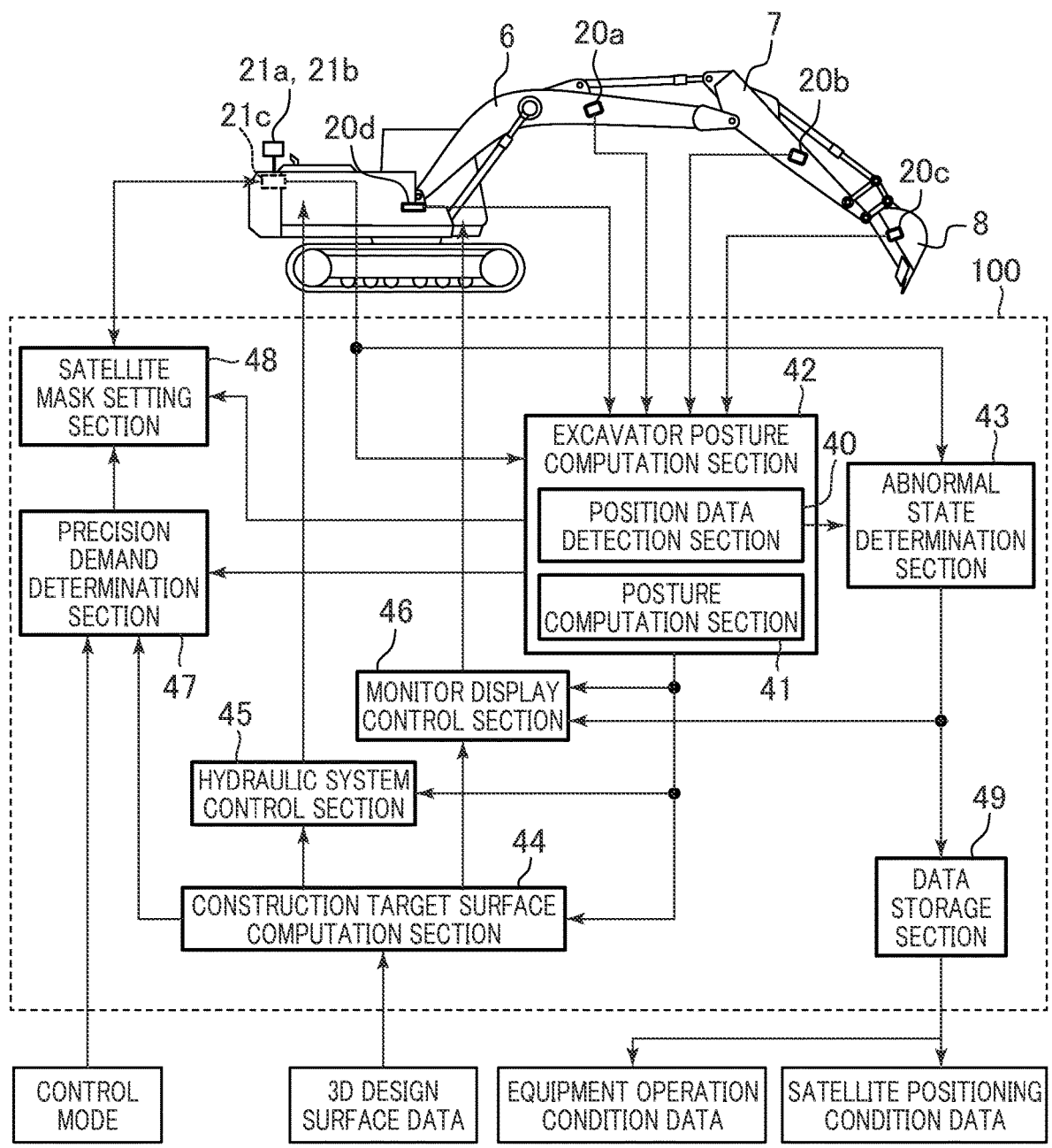
FIG. 3 illustrates a functional block diagram of a controller according to the embodiment of the present invention.

Next, processes performed by the controller 100, with the processes classified into functions, will be described below. FIG. 3 illustrates a diagram (functional block diagram) depicting blocks representing functions realized by some of the processes performed by the controller 100 in the present embodiment.

The controller 100 is a computer having an arithmetic processing device (e.g., a CPU (not depicted)) and a storage device (e.g., a semiconductor memory, a hard disk drive, or the like (not depicted)), and by executing a program stored in the storage device on the arithmetic processing device, functions as various sections (an excavator posture computation section 42, an abnormal state determination section 43, a construction target surface computation section 44, a hydraulic system control section 45, a monitor display control section 46, a precision demand determination section 47, a satellite mask setting section 48, and a data storage section 49) illustrated in FIG. 3. Hereinafter, processes performed by the respective sections will be described.

The excavator posture computation section 42 functions as a position data detection section 40 and a posture computation section 41.

The position data detection section 40 performs computation of converting data on the positions (latitudes, longitudes, and altitudes) of the first GNSS antenna 21a and the second GNSS antenna 21b in the global coordinate system computed by the receiver 21c of the satellite positioning system 21 to position data (coordinate values) in a machine body coordinate system. For example, coordinate values of the first GNSS antenna 21a in the machine body coordinate system are known from design dimensions of the excavator 1 and a measurement using a surveying instrument, such as a total station, and therefore, conversion between the machine body coordinate system and the global coordinate system is possible by use of a coordinate conversion parameter obtained on the basis of the global coordinate system, the inclination angles (a pitch angle and a roll angle) of the upper swing structure 4, and the coordinate values of the first GNSS antenna 21a in the machine body coordinate system. This makes it possible to calculate coordinate values of a center of a boom pin, which corresponds to an origin in the machine body coordinate system, in the global coordinate system. Computation of coordinate values in the global coordinate system of any point of the excavator 1 in the machine body coordinate system is possible.

The posture computation section 41 computes the posture of the hydraulic excavator 1 (the front work implement 3 and the upper swing structure 4) on the basis of the angle information regarding the front members 6, 7, and 8 and the upper swing structure 4 computed via the posture sensors 20a to 20d.

The excavator posture computation section 42 is capable of calculating position data (coordinate values) on the control point (e.g., a center of a bucket claw tip in a width direction of the bucket) in the bucket 8, which the excavator 1 uses for construction, on the basis of the position coordinate data on the boom pin (the origin in the machine body coordinate system) calculated by the position data detection section 40, the orientation (azimuth angle) of the upper swing structure 4, the posture data calculated by the posture computation section 41, and data on the dimensions of the front members 6, 7, and 8 measured and stored in advance. In addition, the excavator posture computation section 42 is also capable of computing posture data for calculating a posture when the image of the side view of the excavator 1 is displayed on the monitor 19. Note that, while the control point is set in the bucket claw tip for execution of the limiting control in the present embodiment, the control point may be set at another position as appropriate according to the content of processing of the machine control.

The construction target surface computation section 44 computes the construction target surface to be excavated by the excavator 1 on the basis of the 3D design surface data inputted from the construction target surface setting device 24 and current position data on the excavator 1 computed by the excavator posture computation section 42, and outputs the computed construction target surface to the hydraulic system control section 45. The construction target surface corresponds to a line of intersection of an operation plane of the front work implement 3 with the 3D design surface data, and the operation plane of the front work implement 3 is a plane perpendicular to each of the front members 6, 7, and 8 and the boom pin and passing through an axial center of the boom pin. The calculated construction target surface can be used in the form of a construction target surface displayed on the monitor 19 as well, and is outputted to the monitor display control section 46. In addition, the calculated construction target surface is outputted to the precision demand determination section 47 as well.

The monitor display control section 46 computes the positional relation between the construction target surface and the front work implement 3 on the basis of the construction target surface computed by the construction target surface computation section 44 and the posture of the front work implement 3 computed by the excavator posture computation section 42, and displays the construction target surface and the front work implement 3 on the monitor 19. This, for example, realizes a function as a machine guidance system that displays the posture of the front work implement 3, including the boom 6, the arm 7, and the bucket 8, and the tip position and angle of the bucket 8 on the monitor 19 to provide assistance in the operation by the operator.

The hydraulic system control section 45 computes and outputs command values for controlling a hydraulic system of the hydraulic excavator 1, the hydraulic system including the hydraulic pump, a control valve, the hydraulic actuators, and the like. In the present embodiment, as machine control, limiting control of controlling the front work implement 3 on the basis of a distance (target surface distance) between the front work implement 3 and the construction target surface such that the range of operation of the front work implement 3 is limited to the construction target surface and a space over the construction target surface can be performed.

More specifically, in the limiting control according to the present embodiment, the controller 100 automatically adds an operation of raising the boom 6 to an operation (e.g., an arm crowding operation) of the arm 7 controlled by the operator such that the velocity component of the bucket claw tip in a direction perpendicular to the construction target surface and toward the construction target surface will approach zero as the target surface distance approaches zero. As a result, on the construction target surface, the velocity component of the bucket claw tip in the direction perpendicular to the construction target surface is maintained at zero. At this time, the velocity components of the bucket claw tip in directions parallel to the construction target surface are not zero, and therefore, the operator is able to cause the claw tip of the bucket 8 to move parallel to and along the construction target surface to carry out an excavation along the construction target surface by inputting an arm crowding manipulation to the corresponding operation lever 18, for example. When the operation of raising the boom 6 is automatically added by the controller 100, a control signal is outputted from the controller 100 to a solenoid proportional valve (not depicted) that outputs a pilot pressure according to the inputted control signal to control a control valve (not depicted) that controls the operation of the boom cylinder 9 through the pilot pressure. Note that, while the limiting control is mentioned as the machine control in the present embodiment, examples of machine control that are applicable include other types of control such as entry prohibition control of automatically controlling various types of hydraulic actuators so as to prevent the control point from entering an entry prohibited area set around the hydraulic excavator 1.

The precision demand determination section 47 is a section that determines whether or not the front work implement 3 is performing a work that demands precision. While a detailed description will be provided with reference to a flowchart of FIG. 8, which will be described below, the precision demand determination section 47 grasps the content of the work of the hydraulic excavator 1 and a demand of the operator on the basis of the position data on the front work implement 3 calculated via the operation levers 18 and the excavator posture computation section 42, data on the construction target surface computed by the construction target surface computation section 44, and the like, and determines whether or not the precision demanded for control of the position of the control point set in the hydraulic excavator 1 is high.

The abnormal state determination section 43 is a section that identifies an abnormality caused in the excavator 1 on the basis of information concerning equipment installed on the excavator 1, such as the posture sensors 20, the satellite positioning system 21, the construction target surface setting device 24, and the communication device 23. For example, in a computerized construction machine on which a machine guidance function is implemented, the operator operates the front work implement 3 in such a manner that the claw tip of the actual bucket 8 will move along the construction target surface while referring to the positional relation between the bucket 8 and the construction target surface presented on the monitor 19. If the construction target surface has nevertheless been excessively excavated by the bucket 8, the operator will recognize that some abnormality has occurred in the hydraulic excavator 1. When such an abnormality has occurred, the abnormal state determination section 43 determines whether a cause thereof is a failure in the equipment or poor conditions for reception of the positioning signals from the positioning satellites or reception of the correction data via the wireless equipment 30. The abnormal state determination section 43 outputs a "positioning condition abnormality flag" to each of the data storage section 49 and the monitor display control section 46 when it has been determined that the cause of the abnormality is a deterioration in satellite positioning conditions, and outputs an "equipment abnormality flag" to each of the data storage section 49 and the monitor display control section 46 when it has been determined that the cause of the abnormality is a failure in the equipment.

(Output of Positioning Condition Abnormality Flag)

Regarding the positioning condition abnormality flag, the receiver 21c regularly outputs the degree of reliability of the positioning via the receiver 21c itself to the controller 100, and when the degree of reliability is equal to or smaller than a predetermined value $Vt1$, the abnormal state determination section 43 (the controller 100) determines that the cause of the abnormality is a deterioration in the satellite positioning conditions, and outputs the positioning condition abnormality flag to each of the monitor display control section 46 and the data storage section 49.

Accepting input of the positioning condition abnormality flag, the display control section 46 displays information (a message or an image) indicating a low reliability of the positioning via the receiver 21c on the monitor 19. The operator is thus able to recognize a need to suspend the work until precision of positioning is recovered when, for example, the limiting control (machine control) is being used for a finishing work, because of a deterioration in the precision of the positioning via the satellite positioning system 21.

Accepting input of the positioning condition abnormality flag, the data storage section 49 collects and stores satellite positioning condition data (which will be described below) while the degree of reliability of the positioning is equal to or smaller than the predetermined value Vt1, and outputs the stored satellite positioning condition data, together with times of acquisition of the data, to the external management server 102 via the communication device 23. At this time, the satellite positioning condition data may be outputted to the storage device 25 to be stored on the hydraulic excavator 1 as well.

The satellite positioning condition data is a generic term referring to data indicating the satellite positioning conditions outputted from the receiver 21c, and includes at least one item of data among, for example, the number of positioning satellites used for the positioning, variance of positions (altitudes) in a heightwise direction among positions (latitudes, longitudes, and altitudes) computed by satellite positioning, VDOP (Vertical Dilution of Precision) computed from the geometrical arrangement of the positioning satellites used for the positioning, and the degree of reliability of the positioning via the receiver 21c. The recording of the satellite positioning condition data on the external management server 102 and the storage device 25 makes it possible to make it clear that the cause of the abnormality is not a failure in the equipment but the satellite positioning conditions, and increases the likelihood that a detailed cause of the deterioration in the satellite positioning conditions can be identified after the event.

(Output of Equipment Abnormality Flag)

Examples of equipment related to the equipment abnormality flag include, in addition to standard equipment installed on the hydraulic excavator 1, such as the engine and the hydraulic pump, equipment installed thereon for computerized construction. Examples of the equipment for computerized construction include the posture sensors 20 installed on the front members 6, 7, and 8 and the upper swing structure 4, the receiver 21c in the satellite positioning system 21, the operation sensors (pressure sensors) 17, the communication device 23, and the wireless equipment 30. When an occurrence of an abnormality has been detected, the abnormal state determination section 43 determines whether or not an abnormality has occurred in each of such pieces of equipment on the basis of output values from various types of sensors that detect operation conditions of such pieces of equipment, data outputted from such pieces of equipment, and the like, and, when it is determined that an abnormality has occurred therein, outputs the equipment abnormality flag to each of the monitor display control section 46 and the data storage section 49.

Accepting input of the equipment abnormality flag, the display control section 46 displays information (a message or an image) indicating an occurrence of an abnormality (failure) in the equipment on the monitor 19. The operator is thus able to recognize a need for a quick and detailed abnormality diagnosis of the equipment, including a determination as to whether or not a replacement of equipment is necessary, for example, because of the occurrence of the abnormality in the equipment.

Accepting input of the equipment abnormality flag, the data storage section 49 collects and stores equipment operation condition data (snapshot data) for a predetermined time around the time of reception of the flag, and outputs the stored equipment operation condition data, together with times of acquisition of the data, to the external management server 102 via the communication device 23. At this time, the equipment operation condition data may be outputted to the storage device 25 to be stored on the hydraulic excavator 1 as well. The equipment operation condition data is a generic term referring to various types of data used for the determination as to whether or not an abnormality has occurred in the equipment, and includes, for example, the position data and the posture data on the hydraulic excavator 1 including the front work implement 3, the operation amounts of the operator, pressure values of the hydraulic operating fluid detected by pressure sensors installed on the hydraulic actuators and hydraulic lines connected thereto, and the like. The recording of the equipment operation condition data on the external management server 102 and the storage device 25 makes it possible to make it clear that the cause of the abnormality is not the satellite positioning conditions but a failure in the equipment, and increases the likelihood that a detailed cause of the failure in the equipment can be identified after the event.

The 3D design surface data, information regarding the soil of a construction site, information regarding a terrain including an area surrounding the construction site, an area in the construction site in which communication is possible, and the like can be stored in the external management server 102, and the external management server 102 can be configured to be capable of grasping communication conditions as well. In addition, data on another work machine that is performing a work in an area surrounding the work machine in which an abnormality has occurred is also simultaneously uploaded to the external management server 102 to make it possible to grasp abnormality data concerning an environment, such as satellites and communication. Furthermore, because a matter concerning the environment, such as a communication system, the satellite positioning, or the like, may cause a deterioration in construction conditions, the state of the arrangement (e.g., values of DOP, including VDOP) of the satellites at the time of an occurrence of an abnormality, and signal levels, and the like, at that time are surveyed and recorded for reporting in the present embodiment.

In particular, when computerized construction is carried out, especially during a work involving machine control that automates a part of an operation of the work machine, a phenomenon such as an excessive excavation of the construction target surface, or a failure for the bucket 8 to approach the construction target surface, may occur. When such a phenomenon happened in the past, a person in charge of a service has needed to visit the site to see the behavior of the actual machine and check the states of various types of sensors and so on, thereby determining whether an abnormality of the machine or a deterioration in positioning conditions due to an influence of surrounding conditions had occurred, for example. In the present embodiment, various types of data at the time of the occurrence of the abnormality are transmitted to the external management server 102, and the content of the work and the states of the installed equipment can be checked, and therefore, an efficient support can be provided after the occurrence of the abnormality.

Next, an example of a scene in which a deterioration in the satellite positioning conditions has occurred during an excavation work will be described below with reference to FIGS. 4 to 6.

Figure 4:
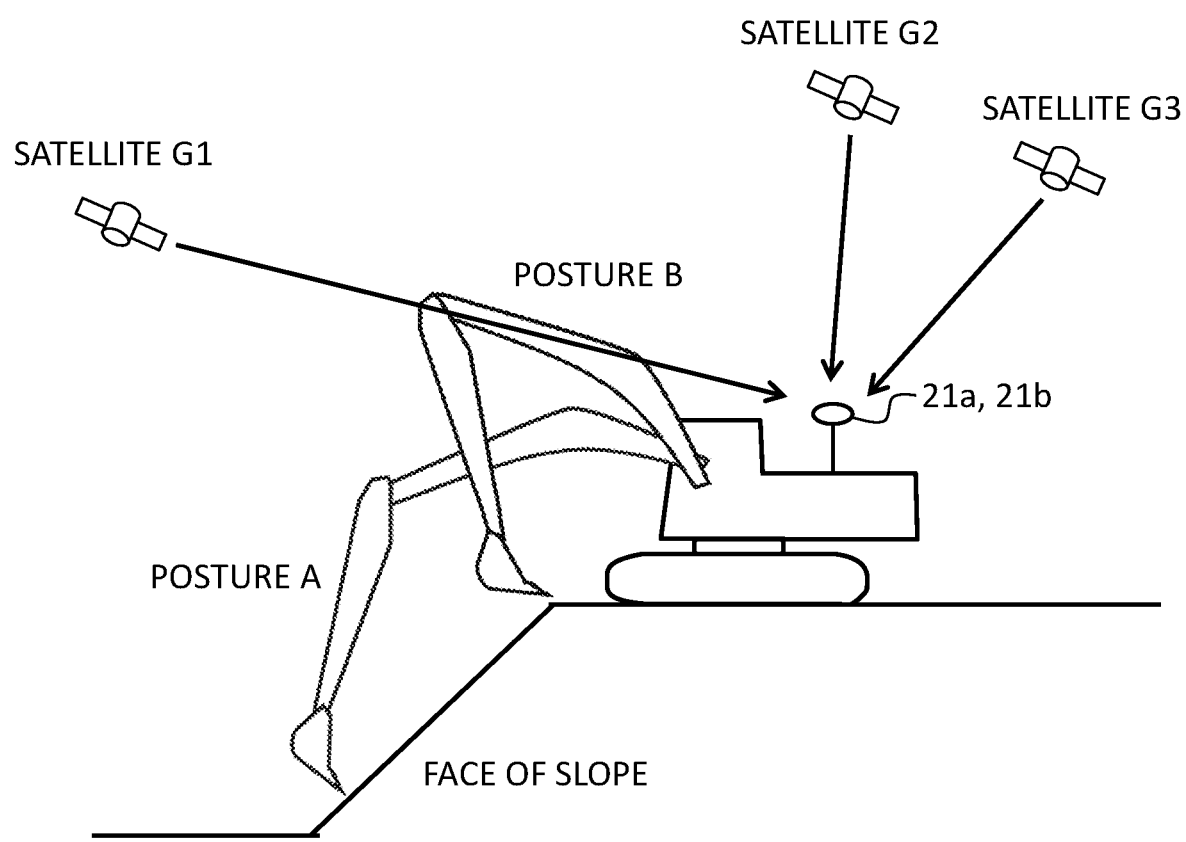
FIG. 4 illustrates an example of positional relations between the hydraulic excavator and positioning satellites.
Figure 5:
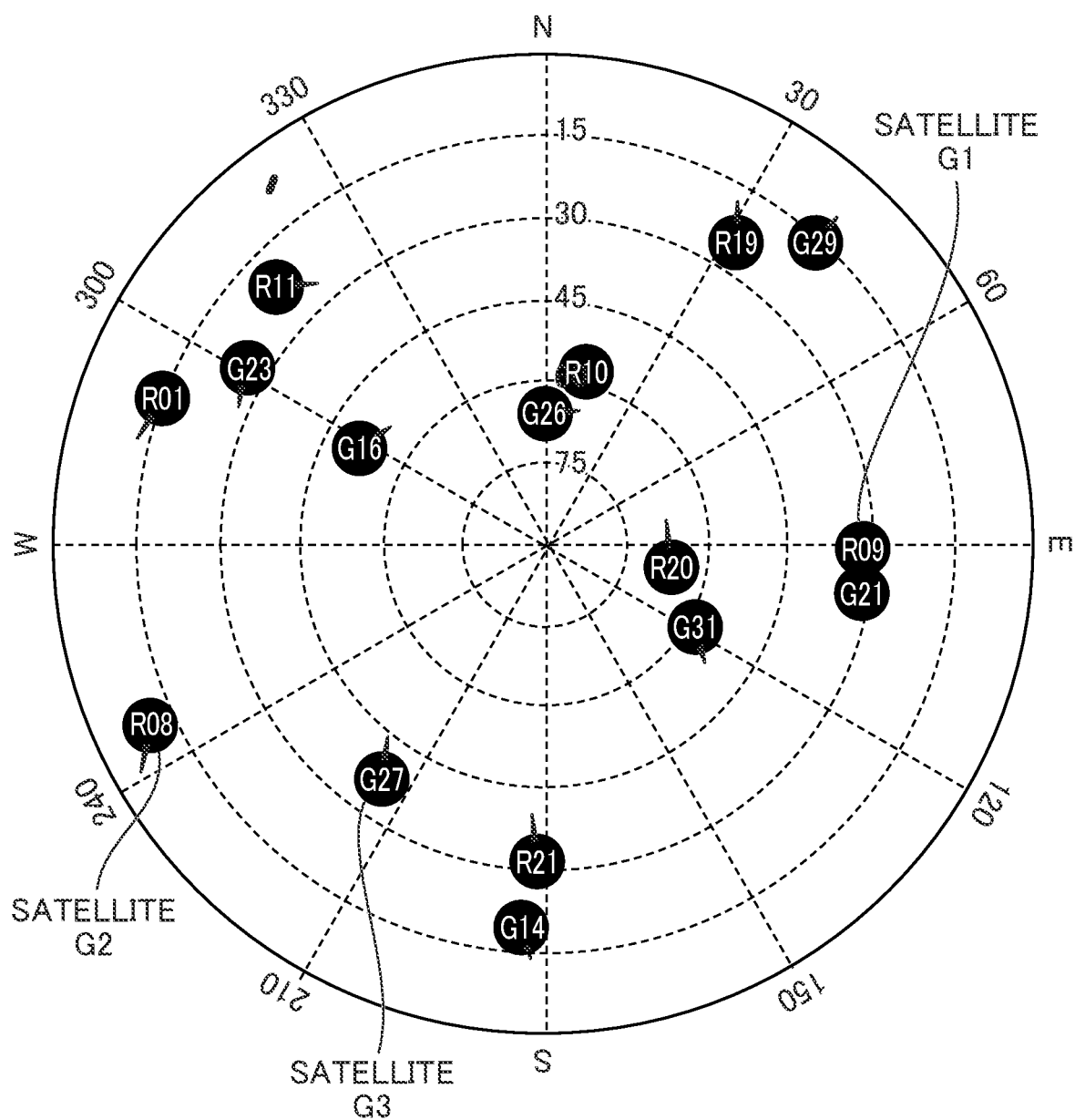
FIG. 5 illustrates an example of arrangement of positioning satellites in the sky over GNSS antennas.
Figure 6:
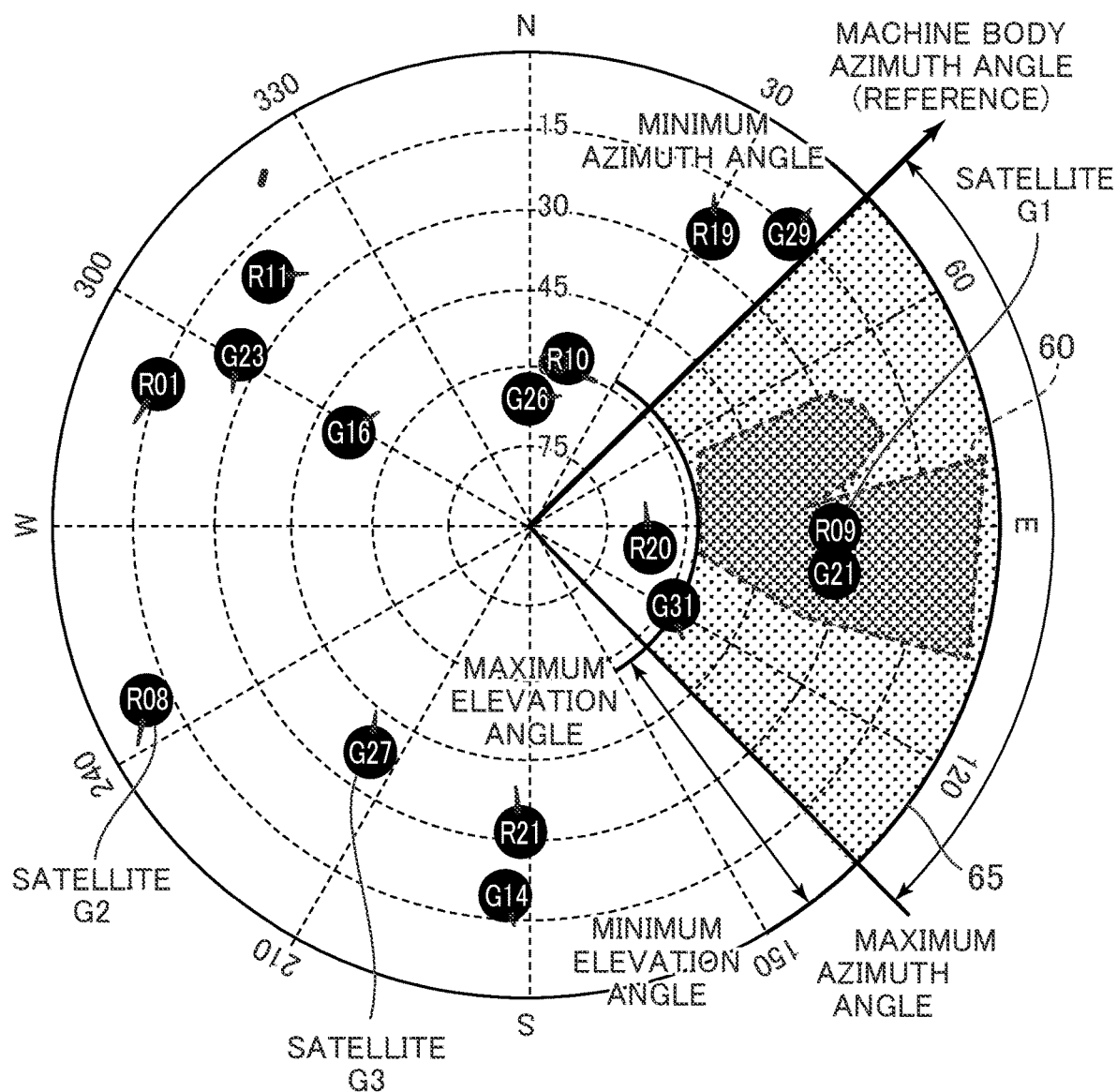
FIG. 6 illustrates a case in which a satellite mask range is set in FIG. 5.

FIG. 4 illustrates posture changes (posture A and posture B) of the hydraulic excavator in a scene in which a positioning signal from a positioning satellite is interrupted by the front work implement 3 performing an excavation operation, while FIGS. 5 and 6 each illustrate a field of vision in the sky over the first GNSS antenna 21a at that time.

In FIG. 4, the hydraulic excavator 1 is performing a finishing work on a face of slope. While referring to the positional relation between the bucket 8 and the construction target surface displayed on the monitor 19, the operator performs an excavation manipulation of the hydraulic excavator such that the claw tip of the bucket 8 will move along the construction target surface. An area 60 enclosed by a broken line in FIG. 6 represents an area (which may be referred to as a "covered area") for which the front work implement 3 (the boom 6, the arm 7, and the bucket 8) can become an obstacle that interrupts a positioning signal before reaching the GNSS antenna 21a or 21b, and in this covered area 60, satellites (e.g., a satellite G1) that transmit positioning signals that can be interrupted exist. In the situation illustrated in FIG. 4, the satellite G1 is visible as illustrated in FIG. 5 when the boom 6 is lowered to excavate an area lower in level than the excavator 1 as indicated by a posture A, but when the boom 6 is raised along with arm crowding as indicated by a posture B, a positioning signal from the satellite G1 is interrupted by the boom 6 as illustrated in FIG. 6. Therefore, during a series of movements as illustrated in FIG. 4, regular changes occur between a case where direct reception of positioning signals from the satellite G1 is possible (posture A) and a case where the positioning signals from the satellite G1 are affected by reflection, diffraction, and the like (posture B). In this case, the combination of positioning satellites that are used for position calculation can change, leading to a greater variation in position measurement results.

When performing a position measurement, the receiver 21c selects the satellites (positioning signals) used for position calculation by determining various conditions, including the qualities of positioning signals from satellites received by the two GNSS antennas 21a and 21b, and the arrangement of GNSS satellites from which the positioning signals are received. The arrangement of the satellites is assessed using numerical values called DOP (Dilution Of Precision), and when, for example, too many positioning satellites are distributed on one side in the field of vision in the sky, the DOP is poor (has a large numerical value), resulting in reduced precision of the position calculation. Meanwhile, when the satellites are evenly distributed in the field of vision in the sky, the DOP is good (has a small numerical value), resulting in improved precision of the position calculation. This is because the position measurement by the satellite positioning system 21 employs a measurement system that applies triangulation. The position measurement by the satellite positioning system 21 has error factors, other than the DOP, that may slightly vary between the satellites, such as an error in trajectory information, a timepiece error of the GNSS satellites, and even when the hydraulic excavator 1 stays at the same position, a difference in the combination of the satellites used for the position calculation may cause a difference in the positions calculated.

In addition, in the construction as described above, a soil dumping work may be performed after the excavation operation, and in this case, after the excavation operation is completed, the boom 6 is raised, a swing operation is performed in a posture with the arm 7 and the bucket 8 folded, and a movement to a soil dumping location is made. At the soil dumping location, the arm 7 and the bucket 8 are caused to make a dump to complete the soil dumping work, and thereafter, a swing is made again, and a return to the excavation location is made to perform a work. In such a scene also, a change in the satellites used for the positioning may occur, because a swing may cause a satellite that has been picked up so far to be invisible or cause a satellite that has not been picked up so far to be visible. Therefore, even when the front work implement 3 has returned to the original position, reproducibility of position measurement may have become deteriorated. Such a deterioration in the reproducibility of position calculation results may cause the positional relation between the construction target surface and the bucket tip displayed on the monitor 19 to be different in each excavation work, which may cause a problem, such as a discontinuity in a finished work.

To overcome such a problem, in the present embodiment, the controller 100 sets a satellite mask range 65 (see FIG. 6) on the machine body coordinate system to limit the positioning satellites that can be employed by the receiver 21c for satellite positioning. In the satellite positioning, the receiver 21c performs a process of computing the position of the first GNSS antenna 21a on the basis of positioning signals transmitted from positioning satellites that remain after excluding the positioning satellite or the positioning satellites located in the satellite mask range 65 set by the controller 100.

Figure 7:
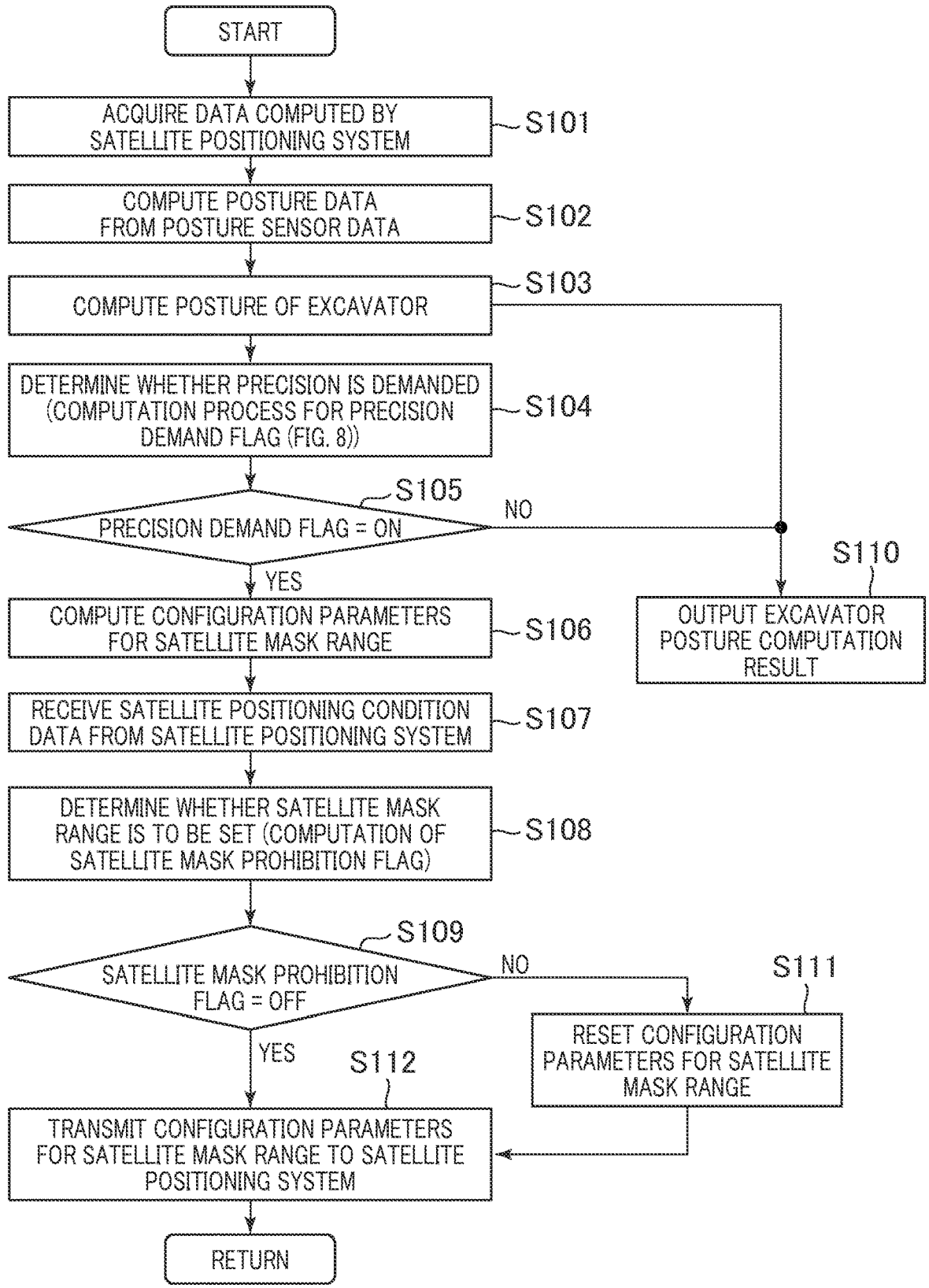
FIG. 7 illustrates a processing flow of the controller according to the embodiment of the present invention.

Next, details of a process of setting the satellite mask range 65 performed by the controller 100 according to the present embodiment will be described below with reference to a processing flow of FIG. 7. In FIG. 7, the processing flow is repeatedly computed at intervals of a fixed time (e.g., 100 ms).

(Process (1) for Setting Satellite Mask Range)

At step S101, the controller 100 acquires the position data on the first GNSS antenna 21a computed by the satellite positioning system 21 (i.e., the receiver 21c), and data on the vector from the first GNSS antenna 21a to the second GNSS antenna 21b.

At step S102, the controller 100 computes, in the excavator posture computation section 42, the posture data on each of the members 5 to 8 on the basis of data (posture sensor data) outputted from the posture sensors (IMUs) 20 attached to the front members 6, 7, and 8 and the upper swing structure 4. At the next step S103, the excavator posture computation section 42 performs a common vector computation and a common coordinate transformation on the basis of the data (the three-dimensional positions of the two GNSS antennas 21a and 21b, and the data on the vector from the first GNSS antenna 21a to the second GNSS antenna 21b) computed by the satellite positioning system 21 and acquired at step S101, and the posture data on each of the members 5 to 8 computed at step S102, thus computing the three-dimensional position of the bucket tip (the control point) and the position and posture of the hydraulic excavator 1 in each of the global coordinate system and the site coordinate system. The position and posture of the hydraulic excavator 1 and the position of the bucket tip (the control point) computed at step S103 are outputted to the abnormal state determination section 43, the construction target surface computation section 44, the hydraulic system control section 45, the monitor display control section 46, the precision demand determination section 47, the satellite mask setting section 48, and so on within the controller 100 as necessary (step S110).

Figure 8:
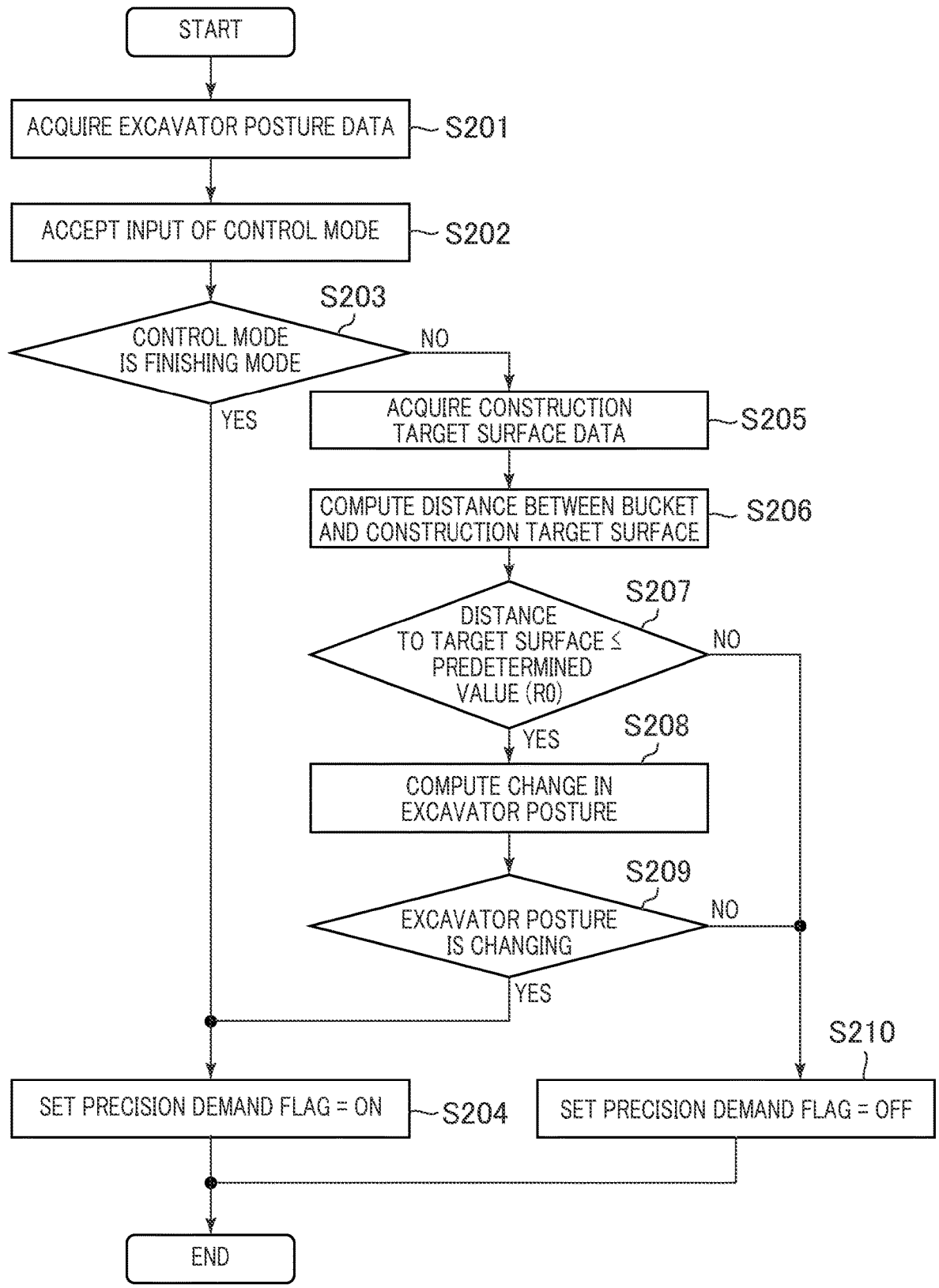
FIG. 8 illustrates a processing flow of the controller (a precision demand determination section) according to the embodiment of the present invention.

At step S104, the controller 100 determines, in the precision demand determination section 47, whether or not the front work implement 3 is performing a work that demands precision (i.e., whether or not a highly precise position computation is required for the position computation on the control point (i.e., the bucket tip)). Here, the description of FIG. 7 is suspended for a time, and details of a process (a computation process for a precision demand flag) performed by the precision demand determination section 47 to determine whether or not precision is demanded will be described below with reference to FIG. 8. FIG. 8 illustrates a processing flow of a method of computing the precision demand flag. In the flow of FIG. 8, the precision demand determination section 47 computes the precision demand flag (i.e., determines ON/OFF of the precision demand flag) on the basis of control mode data outputted from the control mode selection switch 26, construction target surface data outputted from the construction target surface computation section 44, and excavator posture data outputted from the excavator posture computation section 42.

(Computation Process for Precision Demand Flag)

At step S201, the precision demand determination section 47 acquires the excavator posture data (data computed at step S103 in FIG. 7) computed by the excavator posture computation section 42.

Next, the precision demand determination section 47 accepts input of the control mode (the control mode data) selected by the control mode selection switch 26 at step S202, and determines whether or not the selected control mode is the finishing mode at step S203.

When it is determined at step S203 that the finishing mode is selected, it means that the precision of the satellite positioning also needs to be high because the finishing mode naturally requires the position of the bucket tip to be calculated with high precision. Accordingly, the precision demand determination section 47 sets the precision demand flag to ON at step S204, and outputs this result to the satellite mask setting section 48.

Meanwhile, when it is determined at step S203 that the finishing mode is not selected (i.e., when the rough excavation mode is selected in the present embodiment), the precision demand determination section 47 acquires, at step S205, the construction target surface data computed by the construction target surface computation section 44. At the next step S206, the precision demand determination section 47 computes a distance between the construction target surface and the bucket tip (the front work implement 3) on the basis of the excavator posture data acquired at step S201 and the construction target surface data acquired at step S205, and proceeds to step S207. At step S207, the precision demand determination section 47 determines whether or not the distance between the construction target surface and the bucket tip (the front work implement 3) computed at step S206 is equal to or smaller than a predetermined value D1 (e.g., equal to or smaller than 30 cm).

When it is determined at step S207 that the distance between the construction target surface and the bucket tip is greater than the predetermined value D1, the precision demand determination section 47 proceeds to step S210, sets the precision demand flag to OFF, and outputs this result to the satellite mask setting section 48.

Meanwhile, when it is determined at step S207 that the distance between the construction target surface and the bucket tip is equal to or smaller than the predetermined value D1, the precision demand determination section 47 proceeds to step S208, and computes a change in the posture of the front work implement 3. At step S208, the precision demand determination section 47 computes the change in the posture of the front work implement 3 on the basis of a difference between an excavator posture acquired in an immediately previous iteration of the control and an excavator posture acquired in the current iteration, and proceeds to step S209. At step S209, the precision demand determination section 47 determines whether or not there is a change in the excavator posture calculated at step S208.

When it is determined at step S209 that there is a change in the excavator posture, it means that the position of the bucket tip needs to be computed with high precision, considering a possibility that the bucket tip will do damage to the construction target surface, since the distance between the construction target surface and the bucket tip is equal to or smaller than the predetermined value D1, meaning a very short distance therebetween, and, further, the excavator posture is being changed. Accordingly, the precision demand determination section 47 proceeds to step S204, sets the precision demand flag to ON, and outputs this result to the satellite mask setting section 48.

Meanwhile, when it is determined at step S209 that there is not a change in the excavator posture, the precision demand determination section 47 proceeds to step S210, sets the precision demand flag to OFF, and outputs this result to the satellite mask setting section 48. That is, in this case, it is determined that the front work implement 3 is not performing a work that demands precision, because the hydraulic excavator 1 is stationary while the distance between the construction target surface and the bucket tip is short, being equal to or smaller than the predetermined value D1. Although, in the present embodiment, it is determined through computation whether or not the front work implement 3 is in operation on the basis of the change in the posture of each of the front members 6, 7, and (step S208), it may alternatively be determined whether or not the front work implement 3 is in operation on the basis of information inputted from the operation levers 18, i.e., information inputted from the operation sensors 17. Also note that it may be determined whether or not the excavator 1 is excavating on the basis of the position data on the hydraulic excavator 1, the posture sensor data, pressures (the operation amounts) of the operation levers 18, and the construction target surface data. In addition, because the aforementioned items of information are not sufficient to clearly determine whether or not the excavator 1 is actually performing an excavation work, an output from a pressure sensor attached to each of the hydraulic cylinders 9, 10, and 11 may be used for the determination.

Note that the flow of FIG. 8 may be omitted, and the precision demand flag may be set to ON at all times. Also note that the posture data as to the excavator 1 may be acquired not at step S201 but at, for example, step S205, after it is determined that the control mode is not the finishing mode. Also note that, while the ON/OFF of the precision demand flag is determined on the basis of (1) whether or not the selected control mode is the finishing mode, and (2) a combination of the distance between the bucket tip and the construction target surface and whether or not there is a change in the excavator posture, in the example of FIG. 8, the ON/OFF of the precision demand flag may be determined on the basis of at least one of the above (1) and (2). Also note that whether or not there is a change in the excavator posture may be omitted from the condition (2). The change in the excavator posture can include a posture change other than the change in the posture of the front work implement 3 described above.

(Process (2) for Setting Satellite Mask Range)

The description of FIG. 7 is resumed. At step S105, the controller 100 determines whether or not the precision demand flag is ON in the satellite mask setting section 48. When it is determined in this determination that the precision demand flag is ON, the satellite mask setting section 48 proceeds to step S106.

At step S106, the satellite mask setting section 48 computes setting parameters for the satellite mask range 65 to set, on the machine body coordinate system, for example, the satellite mask range 65, which is a range in the field of vision in the sky over the GNSS antennas 21*a* and 21*b* for which the front work implement 3 can become an obstacle when the GNSS antennas 21*a* and 21*b* receive positioning signals from a plurality of positioning satellites in the sky over the excavator. Examples of the setting parameters for the satellite mask range 65 include a minimum azimuth angle and a maximum azimuth angle that define an azimuth range of the mask, and a minimum elevation angle and a maximum elevation angle that define an elevation angle range of the mask (see FIG. 6) with reference to the position of each of the GNSS antennas 21a and 21b. As illustrated in FIG. 6, the satellite mask range 65 is a range enclosed by both the azimuth range from the minimum azimuth angle to the maximum azimuth angle and the elevation angle range from the minimum elevation angle to the maximum elevation angle. Note that, as illustrated in FIG. 6, the azimuth angle (machine body azimuth angle) of the upper swing structure 4 may be set as the minimum azimuth angle.

The satellite mask range 65 is set on the basis of the positional relation between the position (e.g., a coordinate position in the machine body coordinate system set in the upper swing structure 4) at which each of the GNSS antennas 21a and 21b is installed on the upper swing structure 4 (the hydraulic excavator 1) and the movable range of the front work implement 3 (the boom 6, the arm 7, and the bucket 8), the inclination angles of the upper swing structure 4 detected by the posture sensor 20d, and the azimuth angle of the upper swing structure 4 computed from the data on the vector from the first GNSS antenna 21a to the second GNSS antenna 21b. In addition, when there is an existing building or a wall or the like that can become an obstacle, a range for which such an obstacle can cause an adverse effect on the positioning may be added to the satellite mask range 65. Note that the satellite mask range 65 can be set individually for each of the two GNSS antennas 21a and 21b. Also note that the satellite mask range 65 defined by an angle of traverse and an angle of elevation as illustrated in FIG. 6 is merely an example, and that the satellite mask range may be defined by other parameters as long as the satellite mask range is an area that is set with reference to each of the GNSS antennas 21a and 21b.

At step S107, the satellite mask setting section 48 receives data (the satellite positioning condition data) representing the satellite positioning conditions outputted from the receiver 21c in the satellite positioning system 21. The satellite positioning condition data includes, for example, the number of positioning satellites used for the positioning, the variance of the positions (altitudes) in the heightwise direction among the positions (latitudes, longitudes, and altitudes) computed by satellite positioning, the VDOP (vertical dilution of precision), and the degree of reliability of the positioning via the receiver 21c.

At step S108, the satellite mask setting section 48 computes a satellite mask prohibition flag on the basis of the satellite positioning condition data acquired at step S107, and determines whether or not the satellite mask range 65 is to be set. Here, the description of FIG. 7 is suspended again, and details of a process performed by the satellite mask setting section 48 at step S108 will be described below with reference to FIG. 9.

(Computation Process for Satellite Mask Prohibition Flag)

FIG. 9 illustrates a processing flow concerning a method of calculating a prohibition flag (the satellite mask prohibition flag) for a satellite mask process performed by the satellite mask setting section 48. Here, the satellite positioning condition data acquired from the receiver 21c at step S107 is used to determine whether or not the satellite mask range 65 is to be set, and when it is determined that the setting of the satellite mask range 65 leads to reduced precision of positioning computation (e.g., the position data on the upper swing structure 4) performed by the receiver 21c, the setting of the satellite mask range 65 is canceled. The satellite positioning condition data is various types of information concerning a plurality of positioning satellites acquired by the receiver 21c, and examples thereof include NMEA messages obtained from the receiver 21c for the satellite positioning, for example. Data regarding a result of the positioning computation by the receiver 21c can also be included in the satellite positioning condition data.

First, at step S301, the satellite mask setting section 48 acquires the satellite positioning condition data, which is various types of information concerning the satellite positioning system 21. The satellite positioning condition data acquired in the present embodiment includes the signal level of each of the positioning satellites used for the positioning computation, the number of positioning satellites from which positioning signals are receivable, the number of positioning satellites the positioning signals of which have been used for the positioning, positioning results and variance thereof, the VDOP (Vertical Dilution of Precision), which is an indicator of the degree of poorness of the arrangement of the positioning satellites, and the degree of reliability of the result of the positioning computation (the degree of reliability of the positioning).

At step S302, the satellite mask setting section 48 determines whether or not, out of the satellite positioning condition data acquired at step S301, the number of positioning satellites used for the positioning is equal to or greater than a predetermined threshold value Ns (for example, Ns=4). The satellite mask process can improve positioning performance by setting the satellite mask range 65 for a range in the field of vision in the sky over the GNSS antennas 21a and 21b for which the front members 6, 7, and 8 and so on are likely to affect the positioning signals, and excluding any satellites located within the satellite mask range 65 for the positioning. However, masking a satellite when the number of satellites available is small can result in an insufficient number of satellites being used for the positioning computation and in unfavorable conditions for the positioning computation. Accordingly, in the present embodiment, a performance of the satellite mask process is prohibited in such a case. When it is determined in the determination at step S302 that the number of satellites used for the positioning is smaller than the threshold value Ns, control proceeds to step S306, and the satellite mask prohibition flag is set to ON.

Meanwhile, when it is determined at step S302 that the number of satellites used for the positioning is equal to or greater than Ns, control proceeds to step S303.

Note that a reason that the example threshold value Ns of 4 is assumed here is that, while the minimum number of satellites for computing a position in a three-dimensional space is three, positioning signals from four positioning satellites are required to correct a time difference between timepieces.

At step S303, using the satellite positioning condition data acquired at step S301, the satellite mask setting section 48 determines whether or not the satellite mask range 65 is to be set on the basis of whether or not variation in the positions (altitudes) in the heightwise direction among the positions of the excavator 1 (the upper swing structure 4) computed by the receiver 21c falls within a predetermined range. To explain a specific method employed in the present embodiment, the satellite mask setting section 48 determines whether or not deviation (deviation of altitude) dh from an average value of altitudes obtained via the satellite positioning over a predetermined period falls within a predetermined range. Here, the satellite mask setting section 48 determines whether or not the following inequality holds: $-\sigma <$ deviation dh $< \sigma$. For example, $\sigma$ is a standard deviation of the altitudes obtained via the satellite positioning. The standard deviation of the altitudes is the square root of the average (variance of the altitudes) of squared values of differences between the altitudes obtained via the satellite positioning and the average value of the altitudes obtained over the predetermined period. The deviation dh and the standard deviation $\sigma$ can be computed by the satellite mask setting section 48 on the basis of a time series of positioning results outputted from the receiver 21c.

When it is determined at step S303 that the variation in the altitudes falls outside of the predetermined range, control proceeds to step S306, and the satellite mask prohibition flag is set to ON.

Meanwhile, when it is determined at step S303 that the variation in the altitudes falls within the predetermined range, control proceeds to step S304.

At step S304, using the satellite positioning condition data acquired at step S301, the satellite mask setting section 48 determines whether the satellite mask range 65 is to be set on the basis of whether or not the VDOP, computed from the geometrical arrangement of the positioning satellites used for the satellite positioning, is smaller than a predetermined dilution-of-precision threshold value $\alpha$ (for example, $\alpha=1$). Examples of DOP include PDOP (Position Dilution of Precision) and HDOP (Horizontal Dilution of Precision) in addition to the VDOP, and the above determination can be made on the basis of the PDOP or the HDOP, but it is preferable that the determination is made on the basis of the value of the VDOP.

When it is determined at step S304 that the VDOP is equal to or greater than the dilution-of-precision threshold value $\alpha$, control proceeds to step S306, and the satellite mask prohibition flag is set to ON, because the arrangement of the satellites is poor. Meanwhile, when it is determined at step S304 that the VDOP is smaller than the dilution-of-precision threshold value $\alpha$, control proceeds to step S305, and the satellite mask prohibition flag is set to OFF.

(Process (3) for Setting Satellite Mask Range)

The description of FIG. 7 is resumed. At step S109, the controller 100 determines whether or not the satellite mask prohibition flag is OFF in the satellite mask setting section 48. When it is determined in this determination that the satellite mask prohibition flag is ON (a second case), control proceeds to step S111, and the satellite mask setting section 48 resets the setting parameters (e.g., the minimum azimuth angle, the maximum azimuth angle, the minimum elevation angle, and the maximum elevation angle) for the satellite mask range 65 computed at step S106, determining that the setting of the satellite mask range 65 leads to reduced precision of the positioning via the receiver 21c. The setting of the satellite mask range 65 is thus canceled, allowing the receiver 21c to use positioning signals from any satellite for which the front work implement 3 can become an obstacle as well for the positioning.

Meanwhile, when it is determined at step S109 that the satellite mask prohibition flag is OFF (a first case), control proceeds to step S112. At step S112, the satellite mask setting section 48 outputs the setting parameters for the satellite mask range 65 computed at step S106 to the receiver 21c (the satellite positioning system 21), determining that the setting of the satellite mask range 65 leads to an improvement (i.e., not a reduction) in the precision of the positioning via the receiver 21c. The satellite mask range 65 based on the setting parameters is thus set, suspending use of positioning signals transmitted from any positioning satellite located within the satellite mask range 65 for the positioning via the receiver 21c.

(Advantages)

In the hydraulic excavator according to the present embodiment having the above-described configuration, the satellite mask range 65 can be set to prevent any positioning satellite located in a range for which the front work implement 3 can become an obstacle to positioning signals for each of the GNSS antennas 21a and 21b from being used for the positioning, and this leads to improved precision in computing the position of a predetermined control point (e.g., the bucket claw tip) set in the hydraulic excavator 1, which in turn leads to improved precision in controlling the control point and improved precision in construction (the first case).

In addition, regarding the hydraulic excavator according to the present embodiment, even when the precision demand flag is ON and a work that demands high precision of the control of the front work implement 3 is being performed, the setting of the satellite mask range 65 will lead to reduced precision of the positioning with high probability in a case where the number of satellites available for use is insufficient, a case where there is great variation in positioning results, or a case where the satellites available for use are unevenly distributed in arrangement (the second case). Therefore, in such a case, the satellite mask prohibition flag is set to ON to cancel the setting of the satellite mask range 65. This increases the number of satellites that can be used for the positioning, making it possible to make the precision of the positioning higher than in a case where the satellite mask range continues to be set.

In particular, in the present embodiment, the satellite mask prohibition flag is set with focus placed on changes in parameters concerning the heightwise direction (vertical direction), such as the VDOP and the variation in the altitudes out of the positioning results. When the hydraulic excavator 1 is performing a work that demands high precision, the hydraulic excavator 1 does not normally move in the heightwise direction, and the changes in the parameters concerning the heightwise direction are limited. Therefore, determining the ON/OFF of the satellite mask prohibition flag with focus placed on the parameters concerning the heightwise direction can achieve higher reliability than in a case where a parameter concerning a horizontal direction is used for the same determination.

(Others)

Note that the present invention is not limited to the above-described embodiment, and that a variety of modifications are included in the scope of the invention without departing from the gist thereof. For example, the present invention is not limited to embodiments having all of the above-described features of the above-described embodiment, but encompasses embodiments that do not have some of the features. Also note that some features of an embodiment may be added to or replace features of another embodiment.

In the flow of FIG. 9, the satellite mask prohibition flag is set to ON or OFF on the basis of three of the number of satellites (step S302), the variation in the altitudes (step S303), and the VDOP (step S304), but it is to be understood that the satellite mask prohibition flag may be set to ON or OFF on the basis of at least one of the above three. For example, in the flow of FIG. 9, the satellite mask prohibition flag is set to OFF when the number of satellites is equal to or greater than the predetermined threshold value, the variation in the altitudes falls within the predetermined range, and the VDOP is smaller than the predetermined threshold value, but it is to be understood that the satellite mask prohibition flag may be set to OFF when at least one of the above three conditions is satisfied. Also note that the order in which the determinations as to three of the number of satellites (step S302), the variation in the altitudes (step S303), and the VDOP (step S304) are made is not limited to the order illustrated in the flow of FIG. 9, but may be any order.

The determination made at step S303 may not be only as to whether or not the variation in the altitudes falls within the predetermined range as illustrated in FIG. 9, but the latitudes and the longitudes, which are computed by the receiver 21c as are the altitudes, may also be used for the determination. In this case, the determination may be made on the basis of whether or not the variation in at least one of the altitudes, the latitudes, and the longitudes falls within a predetermined range. Although, in the foregoing description, it is determined whether the deviation from the average value of the positions (altitudes) obtained via the satellite positioning over the predetermined period falls within the range of $\pm\sigma$ ($\sigma$=standard deviation), it may be determined whether or not the deviation falls within a range defined by actual numerical values, e.g., $\pm\beta$ [mm], instead of the standard deviation. A specific example of $\pm\beta$ is $\pm 20$ [mm]. This is because it is preferable that the variation falls within this numerical range when a machine error and errors of other posture sensors are taken into account, while, in machine guidance or machine control, precision is demanded at the bucket located at a distal end of the front work implement.

At step S304, it may be determined whether or not not only the VDOP illustrated in FIG. 9 but also each of the HDOP and the DOP is smaller than a predetermined dilution-of-precision threshold value.

Also note that the components of the above-described controller 100, the functions and processes performed by the components, and so on may be implemented partially or entirely in hardware (for example, logic implementing each function may be designed on an integrated circuit). Also note that the components of the controller 100 may be implemented by a program (software) that is loaded and executed by the arithmetic processing device (e.g., the CPU) to realize the functions of the components of the controller 100. Information related to the program can be stored in, for example, a semiconductor memory (a flash memory, an SSD, or the like), a magnetic storage device (a hard disk drive or the like), a recording medium (a magnetic disk, an optical disk, or the like), or the like.

In addition, in the description of each of the embodiments described above, control lines and information lines that are considered to be necessary for explaining the embodiment have been presented, but it is to be understood that all control lines and information lines related to the product may not have been presented. In practice, almost all the components may be considered to be interconnected.

DESCRIPTION OF REFERENCE CHARACTERS

1: Hydraulic excavator
3: Front work implement
4: Upper swing structure
5: Lower travel structure
6: Boom
7: Arm
8: Bucket
9: Boom cylinder
10: Arm cylinder
11: Bucket cylinder
12: Cab
13: Hydraulic swing motor
14a: Crawler belt
14b: Crawler belt
15a: Hydraulic travel motor
15b: Hydraulic travel motor
16: Swing ring
17: Operation sensor
18: Operation lever
19: Monitor (display device)
20a to 20d: Posture sensor (IMU)
21: Satellite positioning system
21a: First GNSS antenna
21b: Second GNSS antenna
21c: Receiver
23: Communication device
24: Construction target surface setting device
25: Storage device
26: Control mode selection switch
30: Wireless equipment
40: Position data detection section
41: Posture computation section
42: Excavator posture computation section
43: Abnormal state determination section
44: Construction target surface computation section
45: Hydraulic system control section
46: Monitor display control section
47: Precision demand determination section
48: Satellite mask setting section
49: Data storage section
60: Covered area
65: Satellite mask range
100: Controller
102: External management server

The invention claimed is:

1. A work machine comprising:
a lower travel structure;
an upper swing structure mounted to the lower travel structure so as to be capable of swinging;
a work implement mounted to the upper swing structure so as to be capable of rotating in a vertical direction;
an antenna that receives positioning signals from a plurality of positioning satellites, the antenna mounted to the upper swing structure;
a receiver configured to compute a position of the upper swing structure on a basis of the positioning signals received by the antenna;
a posture sensor that detects a posture of each of the upper swing structure and the work implement; and
a processor configured to compute a position of a control point set in the work implement on a basis of: the position of the upper swing structure computed by the receiver, an azimuth angle of the upper swing structure, the posture of the work implement detected by the posture sensor, and dimensional data on the work implement, and
a mode selection switch that is a switch capable of selection one of a first mode in which a higher priority is given to an operation velocity of the work implement, and in which no limitation is placed on the operation velocity of the work implement and the work implement operates at a velocity that matches an operation of an operation device, and a second mode in which a higher priority is given to a precision of the construction target surface, and in which a limitation is placed on the operation velocity of the work implement, wherein in a case where the second mode is selected by the mode selection switch, the processor is configured to set, as a mask range, a range in a field of vision in a sky over the antenna for which the work implement can become an obstacle when the antenna receives the positioning signals from the plurality of positioning satellites on a basis of: a position at which the antenna is installed, a movable range of the work implement, the posture of the upper swing structure detected by the posture sensor, and the azimuth angle of the upper swing structure, in a first case in which the processor has determined, on a basis of satellite positioning condition data acquired from the receiver, that setting of the mask range by selecting the second mode leads to improved precision of the computation of the position of the upper swing structure by the receiver, the receiver is configured to compute the position of the upper swing structure on a basis of positioning signals from, out of the plurality of positioning satellites, positioning satellites that remain after excluding a positioning satellite or satellites located in the mask range, in a second case in which the processor has determined, on the basis of the satellite positioning condition data acquired from the receiver, that the setting of the mask range by selecting the second mode leads to reduced precision of the computation of the position of the upper swing structure by the receiver, the receiver is configured to compute the position of the upper swing structure on a basis of the positioning signals transmitted from the plurality of positioning satellites without using the mask range, the setting of the mask range by the processor and the computing of the position of the upper swing structure by the receiver are performed repeatedly at intervals of a fixed time, and in a case where the first mode is selected by the mode selection switch, the processor is configured to compute the position of the upper swing structure on a basis of positioning signals from the plurality of positioning satellites, including a satellite to which the work device can become an obstacle, without setting the mask range.

2. The work machine according to claim 1, wherein
the first case is a case in which at least one of the following conditions is satisfied:
variation in positions of the upper swing structure computed by the receiver on a basis of the positioning signals transmitted from the positioning satellites that remain falls within a predetermined range;
a dilution of precision computed from a geometrical arrangement of the positioning satellites that remain is smaller than a predetermined dilution-of-precision threshold value; and
a number of the positioning satellites that remain is equal to or greater than a predetermined threshold value, and
the second case is a case in which the variation in the positions of the upper swing structure computed by the receiver on the basis of the positioning signals transmitted from the positioning satellites that remain falls outside of the predetermined range,
the dilution of precision computed from the geometrical arrangement of the positioning satellites that remain is equal to or greater than the predetermined dilution-of-precision threshold value, or
the number of the positioning satellites that remain is smaller than the predetermined threshold value.

3. The work machine according to claim 2, further comprising:
a communication device that transmits and receives data to and from an external server, wherein
the processor is configured to output, to the external server via the communication device, data on at least one of the number of the positioning satellites that remain, the variation in the positions of the upper swing structure computed by the receiver on the basis of the positioning signals transmitted from the positioning satellites that remain, the dilution of precision of the positioning satellites that remain, and a degree of reliability of positioning via the receiver inputted from the receiver, when the degree of reliability of the positioning by the receiver inputted from the receiver is equal to or smaller than a predetermined value.

4. The work machine according to claim 1, wherein
the first case is a case in which at least one of the following conditions is satisfied:
variation in positions in a height wise direction among positions of the upper swing structure computed by the receiver on a basis of the positioning signals transmitted from the positioning satellites that remain falls within a predetermined range;
a dilution of precision computed from a geometrical arrangement of the positioning satellites that remain is smaller than a predetermined dilution-of-precision threshold value; and
the number of the positioning satellites that remain is equal to or greater than a predetermined threshold value, and
the second case is a case in which the variation in the positions in the height wise direction among the positions of the upper swing structure computed by the receiver on the basis of the positioning signals transmitted from the positioning satellites that remain falls outside of the predetermined range, or
the vertical dilution of precision computed from the geometrical arrangement of the positioning satellites that remain is equal to or greater than the predetermined dilution-of-precision threshold value.

5. The work machine according to claim 1, further comprising:
a monitor that displays a positional relation between the work implement and a construction target surface to be shaped by an excavation work of the work implement on a basis of position data on the control point computed by the processor, and position data on the construction target surface, wherein
the processor is configured to display information indicating low reliability of positioning by the receiver on the monitor when a degree of reliability of the positioning by the receiver inputted from the receiver is equal to or smaller than a predetermined value.

6. The work machine according to claim 1, wherein
the processor is capable of performing limiting control of controlling the work implement on a basis of a distance between the work implement and a predetermined construction target surface such that a range of operation of the work implement is limited to a space on the construction target surface and a space over the construction target surface,
the first mode of the mode selection switch is a rough excavation mode in which a higher priority is given to the operation velocity of the work implement than to the precision of the construction target surface, the second mode of the mode selection switch is a finishing mode in which a higher priority is given to the precision of the construction target surface than to the operation velocity of the work implement, and the processor is configured to set the mask range when the first mode is not selected by the mode selection switch and the second mode is selected by the mode selection switch.

7. The work machine according to claim 6, wherein the processor is configured to determine that the work machine is performing a work that demands precision and to set the mask range when the distance between the work implement and the construction target surface is equal to or smaller than a predetermined value and the posture of the work implement is being changed, even when the first mode is selected by the mode selection switch and the second mode is not selected by the mode selection switch.

\* \* \* \* \*